United States Patent [19]
Stahl et al.

[11] 3,990,633
[45] Nov. 9, 1976

[54] CENTRIFUGE APPARATUS

[75] Inventors: Lawrence E. Stahl, San Mateo; Lee Gropper, Los Altos Hills, both of Calif.

[73] Assignee: Beckman Instruments, Inc., Fullerton, Calif.

[22] Filed: Apr. 9, 1975

[21] Appl. No.: 566,251

[52] U.S. Cl. .............................. 233/23 R; 233/1 B; 233/26; 415/9; 74/572
[51] Int. Cl.² ...................... B04B 9/10; B04B 7/06
[58] Field of Search ............. 233/1 R, 1 B, 23 R, 233/24, 27, 1 B, 26; 74/572, 573; 415/9

[56] References Cited
UNITED STATES PATENTS

| | | | |
|---|---|---|---|
| 1,142,916 | 6/1915 | Scott | 415/9 |
| 3,097,824 | 7/1963 | Bunger et al. | 415/9 |
| 3,819,111 | 6/1974 | Romanauskas | 233/27 |

*Primary Examiner*—George H. Krizmanich
*Attorney, Agent, or Firm*—R. J. Steinmeyer; F. L. Mehlhoff

[57] ABSTRACT

In a centrifuge including a centrifuge rotor and a drive shaft for spinning the rotor at selected rotational speeds, a safety device adapted to prevent the rotor from attaining a rotational speed likely to cause the rotor to explode with a force that could not be contained within the centrifuge housing. The device includes a hub member having a central opening adapted to receive the upper end of the drive shaft for supporting the rotor thereon, the hub member being formed with oppositely disposed heavier portions connected by relatively thinner web sections. The web sections are so designed and constructed, relative to the weight of the heavier sections, as to rupture at a predetermined rotational velocity of the rotor thereby causing the hub member to depart from the shaft, leaving no driving capacity or support for the rotor on the shaft, which then causes the rotor to separate from the drive shaft before attaining a hazardous rotational speed.

5 Claims, 5 Drawing Figures

CENTRIFUGE APPARATUS

BACKGROUND OF THE INVENTION

The present invention relates in general to centrifuges and more particularly to an arrangement designed to prevent an ultracentrifuge rotor from exceeding a relative speed which could result in a hazardous condition in the form of an uncontained explosion of the rotor.

Ultracentrifuges are generally intended for laboratory use and the rotor drive is designed to make available to the operator any one of many possible speeds of rotation. Several sizes and types of rotors are generally supplied to accommodate various types of work and different rotational speeds. Thus, one rotor may be adapted for one type of separating work and designed for speeds ranging up to 20,000 R.P.M., and another designed for higher speeds which may, for example, range up to 40,000 R.P.M. and another up to 50,000 R.P.M. There is always the possibility that an attendant may select the wrong rotor for the speed of operation selected for the centrifuge with the result that the safe speed of operation for the particular rotor is exceeded.

Because of the high rotative speeds employed in ultracentrifuge equipment, it is not possible to design all of the rotors employed with the centrifuge with a safety factor as high as might normally be considered good engineering practice and, therefore, it is necessary to guard against excessive rotative speeds. Excessive speed may cause a rotor to burst or "explode" into a multitude of fragments and in the event of extremely high rotative energy forces, it is possible that some of these fragments may not be contained within the centrifuge housing and could likely injure an attendant or do great damage to the surrounding laboratory. It is desirable, therefore, to prevent the rotor from attaining a rotative speed at which such high energy is created.

In most instances, an electronic or electromechanical overspeed control means is included as part of the centrifuge or rotor and this will normally prevent a particular rotor from exceeding its designed speed. Examples of such safety devices are disclosed in U.S. Pat. Nos. 2,666,572 and 3,101,322 both of which are assigned to Beckman Instruments, Inc., the assignee of the present invention. Another arrangement for protecting against an overspeed condition is disclosed in patent application Ser. No. 458,837, filed in the name of Herschel E. Wright and assigned to Beckman Instruments, Inc., the assignee of the present invention. There is, however, always the possibility that the electronic, electromechanical or mechanical overspeed control may fail to function properly and thereby permit the rotor to be driven at an excessive speed. The present invention is an improvement over other type devices and provides a further or redundant measure of safety control over and above the normal type of overspeed control apparatus in order to prevent the occurrence of a hazardous explosive condition.

SUMMARY OF THE INVENTION

In accordance with the invention there is provided an arrangement in a high speed centrifuge apparatus for causing the driving hub of the rotor to become detached from the shaft thereby leaving no driving force or support between the shaft and the rotor. To this end, there is provided a hub assembly attached to the bottom of the rotor including a shaft opening into which the drive shaft is positioned for driving the rotor. The hub is provided with oppositely disposed heavier portions connected on opposite sides of the central shaft opening by web sections so designed and constructed as to rupture at a predetermined rotational speed of the rotor, whereby the driving hub is caused to depart from the shaft thereby depriving the rotor of driving capacity and support. This then causes the rotor to depart from the vertical shaft before it attains a speed sufficient to cause the rotor to "explode".

It is a general object of the present invention to provide a centrifuge apparatus having an improved safety device in the form of a hub member for supporting the rotor on the drive shaft, the hub having a design which causes it to depart from the shaft when the shaft exceeds a predetermined rotational speed thereby depriving the rotor of driving capacity and support.

It is another object of the present invention to provide a safety device of the above character which operates in response to the magnitude of a centrifugal force applied to the driving hub as the rotor reaches a predetermined rotational velocity.

Further objects and advantages of the invention will become apparent as the following description proceeds and the features of novelty which characterize the invention will be pointed out with particularity in the claims annexed to and forming a part of this specification.

DESCRIPTION OF THE PREFERRED EMBODIMENT

Figure 1:
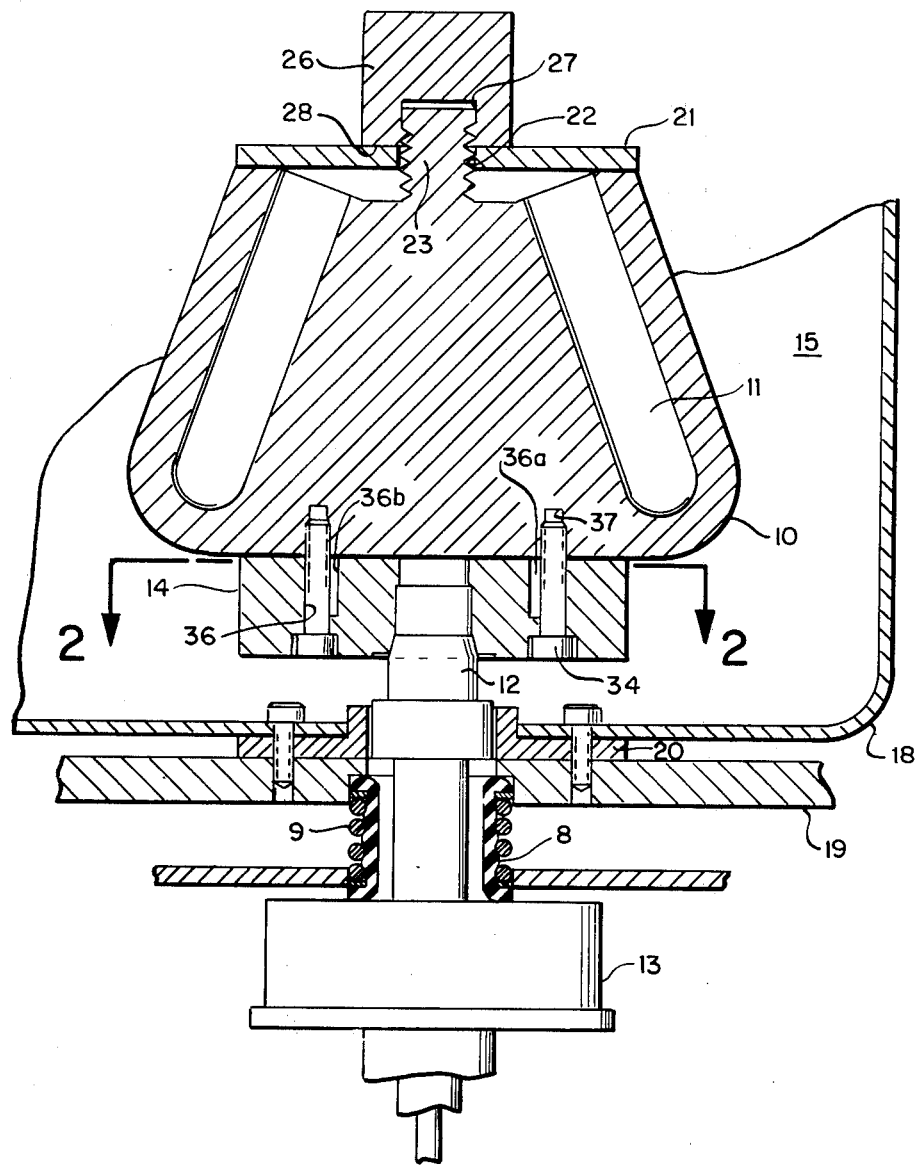
FIG. 1 is a vertical cross-sectional view of a rotor and a portion of the drive assembly of the centrifuge and illustrating the attachment of the rotor to the hub.

The apparatus of FIG. 1 includes a centrifuge rotor 10 having a plurality of sample receiving wells 11. A vertically extending shaft 12 is carried by a journal mounting 13 and is adapted to be driven by an electrical motor (not shown) through a suitable gearing (not shown). The rotor is normally enclosed within a chamber 15 which may be suitably sealed to provide a vacuum therein and which may be suitably refrigerated in order to maintain a predetermined temperature therein. The top (not shown) of the chamber is removable in order to provide access to the rotor.

The lower wall 18 of the chamber may be secured to mounting plate 19 which may also serve as a vacuum chamber. A collar 20 supports the lower wall 18 of the chamber 15 above the plate 19. A vacuum sealing member 8 formed of rubber or the like extends between the plate 19 and the journal mounting 13 and is expanded by compression spring 9 to hold its end faces in sealing engagement with the cooperating metal surfaces.

The rotor 10 is provided with a lid member 21 having a hole formed centrally therein and adapted to slide over a central stud 23 formed on the rotor and extending upwardly along the rotational axis thereof. The lid is retained in place above the container receiving wells 11 and mates with the outer edge surfaces of the rotor in these regions. The lid 21 is retained on the rotor by the hole 22 formed in the lid and by a locking nut or centerpiece 26 which is turned down onto the lid 21 so that the lower surface 28 of the centerpiece abuts the upper surface of the lid 21 and forces the lid downwardly against the rotor.

As will be seen in FIG. 1, the rotor 10 is supported and coupled to the end of the shaft 12 by a hub member 14 which accommodates the upper end of the drive shaft 12. The cooperation between the drive shaft 12 and the opening 16 of the hub member is such that the friction therebetween causes the rotor to rotate.

Figure 2:
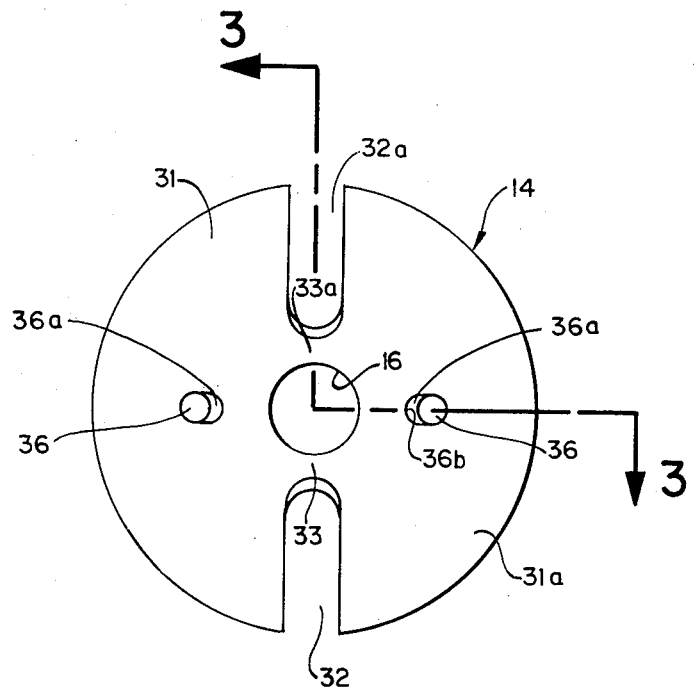
FIG. 2 is a plan view of the hub member taken along line 2—2 in FIG. 1.
Figure 3:
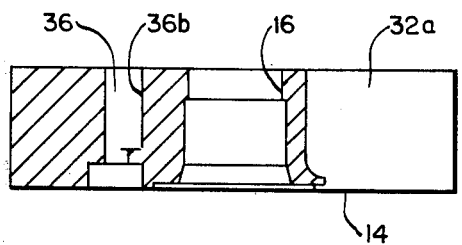
FIG. 3 is a cross-sectional view of the hub member of FIG. 2 taken along line 3—3.

As may best be seen in FIGS. 2 and 3, the hub 14, in its preferred form, is a substantially cylindrical-shaped body having slots 32 and 32a formed on opposite sides of the shaft opening 16 thereby dividing the cylindrical body into oppositely disposed semicircular shaped, heavier sections 31 and 31a. Sections 31 and 31a are attached to each other through the web sections 33 and 33a formed between the slots and the opening 16. In the preferred embodiment, the hub 14 is attached to the bottom of the rotor 10 by means of screws or bolts 34 (see FIG. 1) positioned through holes 36 formed in the heavier or larger sections 31 and 31a of the hub member. Bolts 34 are then threaded into threaded holes 37 formed in the bottom of the rotor.

The web sections 33 and 33a are so designed and constructed with respect to the size and weight of the heavier portions 31 and 31a of the hub, that the forces or stresses created when the rotor reaches a predetermined rotational speed will cause the web sections 33 and 33a to fail or rupture. For example, if the rotor is rated at a rotational speed of 50,000 R.P.M., and it will explode at, for example, 70,000 R.P.M., the hub member is designed and constructed so that the centrifugal force asserted by the heavier portions 31 and 31a, created by the rotation thereof, will be sufficiently great at perhaps 55,000 R.P.M. or 60,000 R.P.M. to cause the thin web sections 33 and 33a to rupture. When the thin web sections rupture, the heavier portions 31 and 31a of the hub member move away from the central opening 16 and actually depart from the shaft 12. When this occurs, there is no longer any friction between the hub and the shaft and no driving force created by the cooperation of the hub and shaft. Under such forces the hub departs from the shaft, and deprives the rotor of any support. The rotor also completely disengages from the drive shaft. This occurs at a speed below the speed at which the rotor might "explode" so that, while the rotor will fly off the end of the drive shaft and thrash around within the chamber, it will be retained within the chamber without fragmenting and throwing fragments out through the chamber and housing where they could possibly do injury to an attendant.

Because the hub in the preferred embodiment is attached to the rotor by means of bolts 34 positioned through the holes 36 in the hub member, means must be provided to prevent these bolts from holding the heavier sections of the hub in place around the drive shaft when the forces created by the rotation of the rotor are great enough to cause the thin web sections 33 and 33a to rupture. In order to reduce the force necessary to overcome the restraining effect of the bolts 34 on the heavier portions of the hub member, the holes 36 are formed with a counterbore portion 36a (seen best in FIGS. 2 and 3). In this manner, the inner sidewall 36b of the hole 36 does not abut directly against the bolt 34 when the hub is attached to the rotor. Thus, the space between the bolt and the inner sidewall 36b of the countersunk hole permits some movement of the heavier portions 31 and 31a of the hub member when there is a rupture of the thin web sections of the hub member. On movement of the heavier sections 31 and 31a slightly toward the bolts 34, the forces become so great as to cause the bolts to bend and either become sheared or pulled from the rotor. If the inner surface 36b of the hole 36 were to be directly adjacent the bolt 34, it would then be necessary for the heavier sections 31 and 31a to shear the bolts adjacent the juncture between the rotor and the hub member. While it is possible to calculate the shearing force necessary to rupture the bolts, this would add another factor of error to the safety device and would necessarily broaden the rotational speed range over which it would operate.

A tested embodiment of the invention utilized a hub member of the above illustrated design, formed of aluminum, having a diameter of approximately 4.0 inches and a thickness of approximately 1⅜ inches. Slots formed in the member produced a web thickness averaging ⅛ inch for the thickness of the material. The hub member was attached to the bottom of an aluminum rotor having a rated rotational speed of 25,000 R.P.M. and which would burst or explode at or about 45,000 R.P.M. The hub member was so designed as to rupture between 32,000 and 38,000 R.P.M. in the event all other speed controls of the centrifuge failed. In the tested embodiment, the safety controls of the centrifuge were purposely bypassed and the rotor permitted to gradually increase its rotational speed beyond its rated speed. When the rotor reached a speed of approximately 36,000 R.P.M., the web sections of the hub member ruptured and the hub member immediately departed from the shaft. The rotor departed from the shaft and bounced and thrashed around the chamber where it did substantial damage to the chamber, but was completely contained therein. When the rotor departs at high speed from the drive shaft it does possess a great amount of energy which is gradually dissipated. This will undoubtedly damage the interior of the chamber and the drive shaft, but it does not reach a rotational speed (even if the rotor should break up) that would not be contained within the rotor chamber or at least within the vacuum chamber of the housing.

Figure 5:
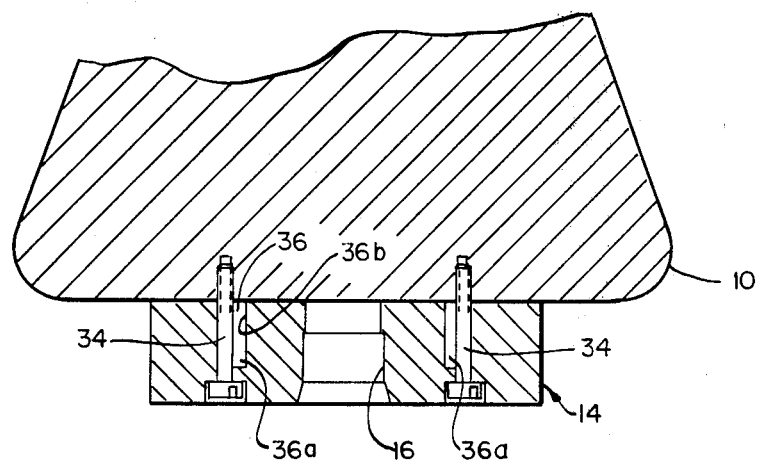
FIG. 5 is a cross-sectional view of the hub member of FIG. 4 and attached to the bottom of a rotor.
Figure 4:
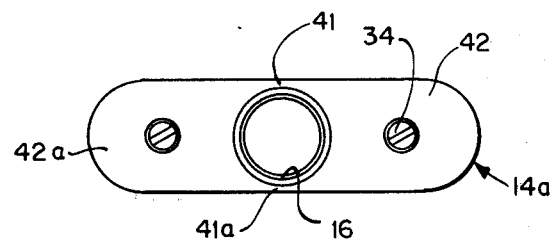
FIG. 4 is a plan view illustrating another embodiment of the hub member.

Referring now to FIGS. 4 and 5 of the drawings, there is shown a second embodiment of the invention in which the hub member, identified by the reference numberal 14a, is an elongated body having a length greater than its width. In this embodiment of the invention, the central opening 16 designed to accept the shaft 12 is somewhat less than the total width of the member and creates web sections 41 and 41a connecting heavier end sections 42 and 42a. The hub 14a is attached to the rotor 10 in a manner similar as the hub 14 described above. As in the previous embodiment, bolts 34 are positioned through the holes 36 and the holes have a counterbore portion providing a space 36b between the side of the bolt 34 and the inner sidewall 36a of the hole thereby reducing the shearing requirement for rupture of the bolt. The member 14a is so designed and constructed that the web sections 41 and 41a will rupture at some predetermined rotational velocity of the rotor, such as 60,000 R.P.M., if, for example, the rotor were rated at 50,000 R.P.M. and could "explode" at perhaps 70,000 R.P.M. This rupture speed is, of course, designed to accommodate the particular rotor to which the hub is attached. On reaching its predetermined rupture speed, the centrifugal forces on the heavier end portions 42 and 42a become so great that the web sections 41 and 41a fail and the end portions 42 and 42a move or depart from their position around the shaft opening thereby leaving no driving force or support for the rotor. It is apparent that the breaking rupture speed may be easily controlled by controlling the thickness of the thin web sections 41 and 41a in relation to the weight of the end portions 42 and 42a and, thus, the hub member may be designed for a wide variety of rupture speeds.

It will be evident that this apparatus provides another level of safety for high energy ultracentrifuge rotors. It adds a new dimension to the overspeed safety profile for centrifuge rotors and, while damage will occur to the centrifuge, in the event this safety device must operate, it does prevent the high speed rotors from reaching a speed where they will actually explode or burst thereby causing injury or damage to persons or property adjacent the centrifuge apparatus.

While in accordance with the patent statutes there has been described what at present is considered to be the preferred embodiments of the invention, it will be understood by those skilled in the art that various changes and modifications may be made therein without departing from the invention. It is, therefore, the aim of the appended claims to cover all such changes and modifications that fall within the true spirit and scope of the invention.

What is claimed is:

1. A rotor for a high speed centrifuge having a vertical drive shaft with the upper end thereof adapted to couple to the rotor for rotating the rotor with the shaft, comprising:
    a rotor body symmetrically conformed around a central axis;
    sample carrying means supported by said rotor body for rotation therewith;
    a safety hub assembly attached to the bottom of said rotor for coupling said rotor to said shaft, said hub assembly having a central opening for receiving said shaft, said hub being provided with outer relatively heavier sections on opposite sides of said central opening and thin web sections connecting said heavier sections on opposite sides of said central opening, said web sections being relatively thin compared to said heavier sections and so designed and constructed as to rupture under the centrifugal force created by said heavier sections at a predetermined rotational velocity of said rotor whereby said hub is caused to depart from said shaft leaving no driving capacity or support for said rotor on said shaft.

2. The rotor defined in claim 1 in which the rotor hub is a separate member attached to the bottom of said rotor by means of bolts passing through the heavier sections of said hub, and including counterbores surrounding said bolts at the juncture between said hub and the bottom of said rotor and providing a space on the radially inward facing side of each of said bolts to permit said heavier sections of said hub to move without requiring a shearing action against said bolts when said predetermined rotational velocity is attained.

3. The rotor defined in claim 1 in which said rotor hub is generally cylindrical in shape with slots cut on opposite sides thereof to form thin web sections adjacent to said central opening and oppositely disposed semicircular heavier sections attached to said thin web sections.

4. The rotor defined in claim 1 in which said hub body is an elongate member having a relatively long dimension in one direction and a relatively narrower dimension in the opposite direction, the narrower dimension and said central opening forming thin web sections on the sides of said hub which web sections are relatively thin compared to the end sections of the hub attached thereto and are designed to rupture at a predetermined centrifugal force created by the size and weight of the end sections of said hub connected to said web sections.

5. A rotor for a high speed centrifuge having a vertical drive shaft with the upper end thereof adapted to couple to the rotor for rotating the rotor with the shaft comprising:
    a rotor body symmetrically conformed around a central axis;
    sample carrying means supported by said rotor body for rotation therewith;
    a hub assembly in the form of a substantially cylindrically shaped body having a central opening therein for receiving said shaft, said body being slotted on opposite sides thereof to form thin web sections adjacent said central opening and oppositely disposed semicircular shaped heavier sections attached to said thin web sections, said web sections being relatively thin compared to said heavier sections;
    holes formed through said heavier sections of said hub, said holes each having a counterbore substantially through the major thickness of said hub section and adjacent the juncture between said hub and the bottom of said rotor;
    bolt means disposed through said holes and attaching said heavier sections to the bottom of said rotor, said counterbore of each of said holes creating a space between the radially inward facing side of said bolt and the radially inward sidewall of said hole, permitting said heavier sections to move without requiring a shearing action against said bolt members holding said hub section to said rotor; and
    said thin web sections being so designed and constructed as to rupture under the centrifugal force created by said heavier sections at a predetermined rotational velocity whereby said hub body is caused to depart from said shaft leaving no driving capacity or support for said rotor on said shaft.

* * * * *